United States Patent [19]
Hishida et al.

[11] Patent Number: 5,808,712
[45] Date of Patent: Sep. 15, 1998

[54] TRANSMISSION LIQUID CRYSTAL DISPLAY DEVICE WITH A LIQUID CRYSTAL PANEL HAVING HIGH LUMINANCE AND WIDE VIEW FIELD ANGLE

[75] Inventors: Tadanori Hishida, Kashihara; Tetsurou Koyama, Tenri; Takayuki Shimada, Yamatokoriyama; Mikio Katayama, Ikoma, all of Japan

[73] Assignee: Sharp Kabushiki Kaisha, Osaka, Japan

[21] Appl. No.: 719,537

[22] Filed: Sep. 25, 1996

[30] Foreign Application Priority Data

Sep. 28, 1995 [JP] Japan ................................. 7-251099

[51] Int. Cl.⁶ ............................................. G02F 1/00
[52] U.S. Cl. ............................... 349/95; 349/42; 349/138
[58] Field of Search ............................ 349/95, 42, 138

[56] References Cited

U.S. PATENT DOCUMENTS

| | | | |
|---|---|---|---|
| 4,790,632 | 12/1988 | Miyakawa et al. | 349/95 |
| 5,032,883 | 7/1991 | Wakai et al. | 357/23.7 |
| 5,056,912 | 10/1991 | Hamada et al. | 349/95 |
| 5,166,085 | 11/1992 | Wakai et al. | 437/40 |
| 5,349,453 | 9/1994 | Munakata | 349/95 |
| 5,585,951 | 12/1996 | Noda et al. | 349/42 |
| 5,641,974 | 6/1997 | den Boer et al. | 257/59 |

FOREIGN PATENT DOCUMENTS

| | | | |
|---|---|---|---|
| 60-165 623-A | 8/1985 | Japan . | |
| 62-267723 | 11/1987 | Japan | 349/95 |

OTHER PUBLICATIONS

Patent Abstracts of Japan, re Naemura + UENO/NEC unex. pub'n 60–165 623–A (28 Aug. 1985) which matured into patent JP 7–056 547 (14 Jun. '95).

Primary Examiner—William L. Sikes
Assistant Examiner—Toan Ton
Attorney, Agent, or Firm—David G. Conlin; William J. Daley, Jr.

[57] ABSTRACT

A transparent liquid crystal display device has an interlayer insulating film formed of a highly transparent, organic thin film having light condensing ability provided over a switching element, a gate signal line and a data signal line. As light condensing ability is provided within the interlayer insulating film with a pixel electrode formed of a transparent conductive film provided on said interlayer insulating film, the interlayer insulating film is not readily scarred and a polarizer can be readily stuck to the interlayer insulating film.

8 Claims, 5 Drawing Sheets

TRANSMISSION LIQUID CRYSTAL DISPLAY DEVICE WITH A LIQUID CRYSTAL PANEL HAVING HIGH LUMINANCE AND WIDE VIEW FIELD ANGLE

BACKGROUND OF THE INVENTION

1. Field of the Invention

The present invention relates to a transmission liquid crystal display device including a switching element such as a thin film transistor (hereinafter referred to as a "TFT"). It particularly relates to a high luminance, transmission liquid crystal display device.

2. Description of the Background Art

FIG. 4 is a cross sectional view of the configuration of a liquid crystal panel in a conventional transmission liquid crystal display device. In the transmission liquid crystal display device, a polarizer (not shown) is stuck at both upper and lower side surfaces of the liquid crystal panel and a back light (not shown) as a back irradiator is also provided on the bottom side in the figure. The panel is directly viewed from the top side in the figure.

In FIG. 4, a plurality of pixel electrodes 15 are formed in a matrix on a transparent substrate 11, and a scanning line (referred to as "a gate signal line") and a signal line (referred to as "a data signal line") are formed to orthogonally cross between adjacent pixel electrodes. A shielding film 18 is formed on the other transparent substrate 17 and a transparent conductive film 19 is formed to cover shielding film 18.

Provided near a cross point of the gate signal line and the data signal line is a TFT used as a switching element, and the gate electrode of the TFT is connected to the gate signal line, another electrode is connected to the data signal line and the other electrode is connected to a pixel electrode. Turning on/off or display gradation of a pixel is determined by switching function of the TFT so that display is performed.

However, with the conventional art, display is performed at a luminance lower than the original luminance, since of the light emitted from the back light, only light a passing through the gap in shielding film 18 formed over transparent substrate 11 is utilized for display.

Japanese Patent Publication No. 7-56547 discloses a configuration in which a microlens 20 formed of a transparent resin layer is formed at an outer side of the liquid crystal panel, as shown in FIG. 5, in order to more efficiently utilize the light emitted from the back light. According to this configuration, that light from the back light which would be shielded by shielding film 18 or signal line 12 is condensed onto the pixel portion so that one pixel transmits light b. Thus, the amount of the light utilized for display is larger than that of light a so that high luminance is substantially achieved.

However, with the technique disclosed in Japanese Patent Publication No. 7-56547, since the microlens formed of resin is formed external to the liquid crystal panel, the surface of the microlens is readily scarred and hence radius of curvature of the lens is readily changed. This prevents the lens from satisfactorily condensing light. Furthermore, it is difficult to stick the polarizer since that surface of the liquid crystal panel which forms the surface of the microlens is not flat.

In order to solve these problems, a microlens may be formed on another substrate, not on the glass which forms the liquid crystal panel, and the microlens substrate may be stuck at the liquid crystal panel. However, this increases the number of components as well as manufacturing cost.

Furthermore, with the above conventional art, while high luminance of the liquid crystal display device can be achieved, wider view field angle is not achieved, since pixel electrode 15 and interconnection 12 are formed on the same plane and thus the area of pixel electrode 15 should be smaller than the portion surrounded by interconnection 12, resulting in reduced numerical aperture.

SUMMARY OF THE INVENTION

Therefore, an object of the present invention is to provide a transmission liquid crystal display device with high luminance liquid crystal panel.

Another object of the present invention is to provide a transmission liquid crystal display device with a liquid crystal panel having wide view field angle.

Still another object of the present invention is to provide a transmission liquid crystal display device with a liquid crystal panel having wide view field angle which can be manufactured at reduced cost.

The above objects of the present invention can be achieved by a transmission liquid crystal display device including the elements described below. That is, a transmission liquid crystal display device carrying a liquid crystal layer between a pair of transparent substrates according to the present invention includes lines provided on one of the paired transparent substrates, a switching element provided near a cross point of the lines, a highly transparent, organic thin film provided over the lines and the switching element, an electrode provided on the organic thin film, and a condenser provided within the organic thin film at a position corresponding to the electrode.

In the present invention, since a highly transparent, organic thin film is provided over a scanning line, a signal line and a switching element provided near a cross point of the lines and a condenser is formed within the organic thin film at a region corresponding to the pixel electrode, the amount of the light passing through one pixel can be increased. Consequently, a transmission liquid crystal display device with high luminance liquid crystal panel can be provided.

Preferably, the organic thin film is formed of two types of materials each having a different refractive index.

Since the organic thin film is formed of two types of materials each having a different refractive index, the light passing through the organic thin film is refracted. Utilizing the refraction, light can be condensed onto one pixel.

Still preferably, the condenser is a convex microlens formed at a region corresponding to the pixel electrode.

Focal length of light can be reduced by forming an organic thin film having a larger refractive index as a convex microlens at a region corresponding to the pixel electrode and by forming the other organic thin film on the organic thin film formed as the convex microlens. Furthermore, the organic thin film having the smaller refractive index formed above can serve as a film for flattening and protection.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will now be described with reference to FIG. 1.

Figure 1:
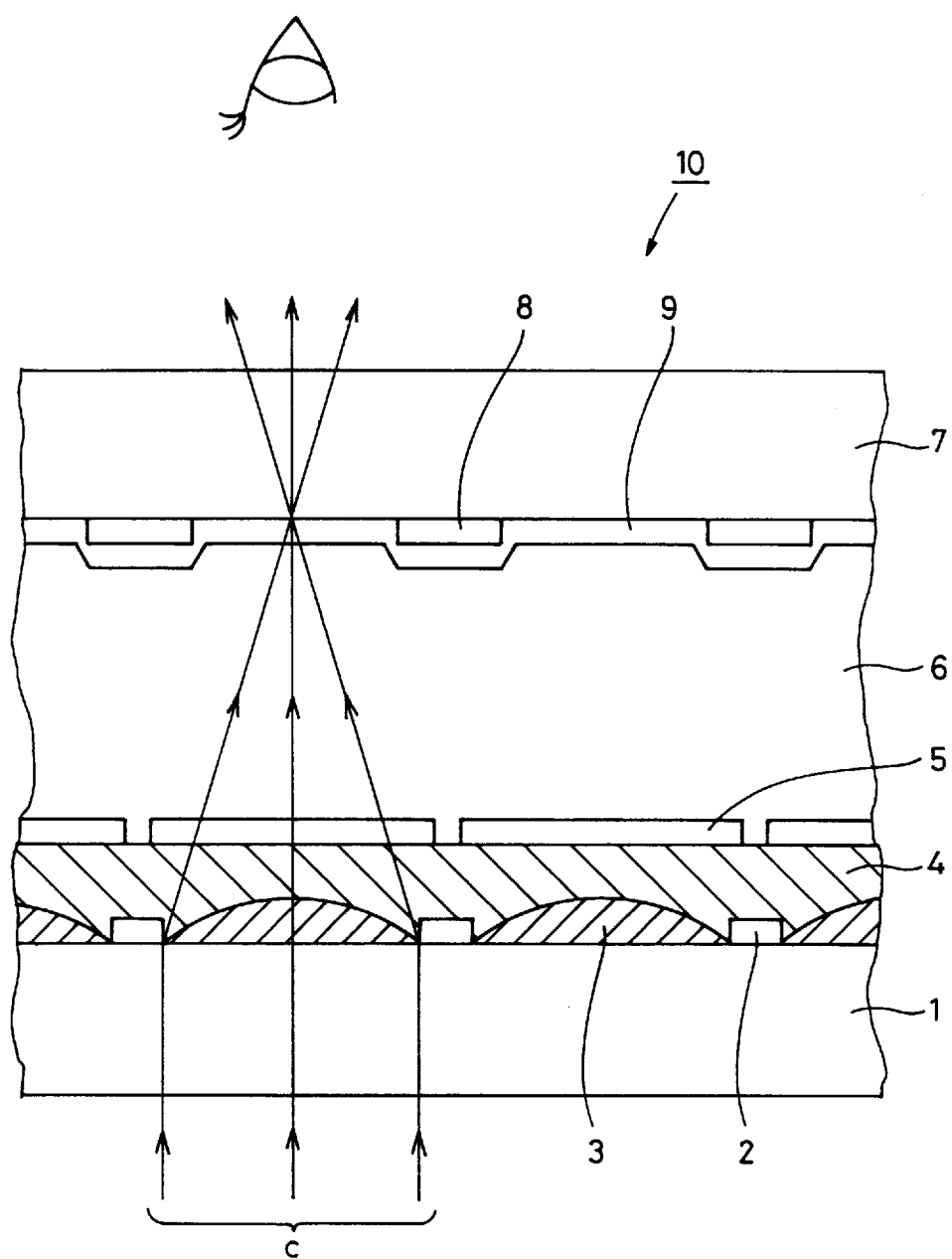
FIG. 1 is a cross sectional view of a liquid crystal panel in a transmission liquid crystal display device according to the present invention.

FIG. 1 is a cross sectional view of the configuration of a liquid crystal panel 10 in a transmission liquid crystal display device according to an embodiment of the present invention. In the transmission liquid crystal display device according to the present embodiment, polarizers (not shown) are stuck at the both sides of liquid crystal panel 10, a back irradiator (not shown) such as a back light is provided on the bottom side in the figure, and panel 10 is directly viewed from the top side in the figure.

Figure 2:
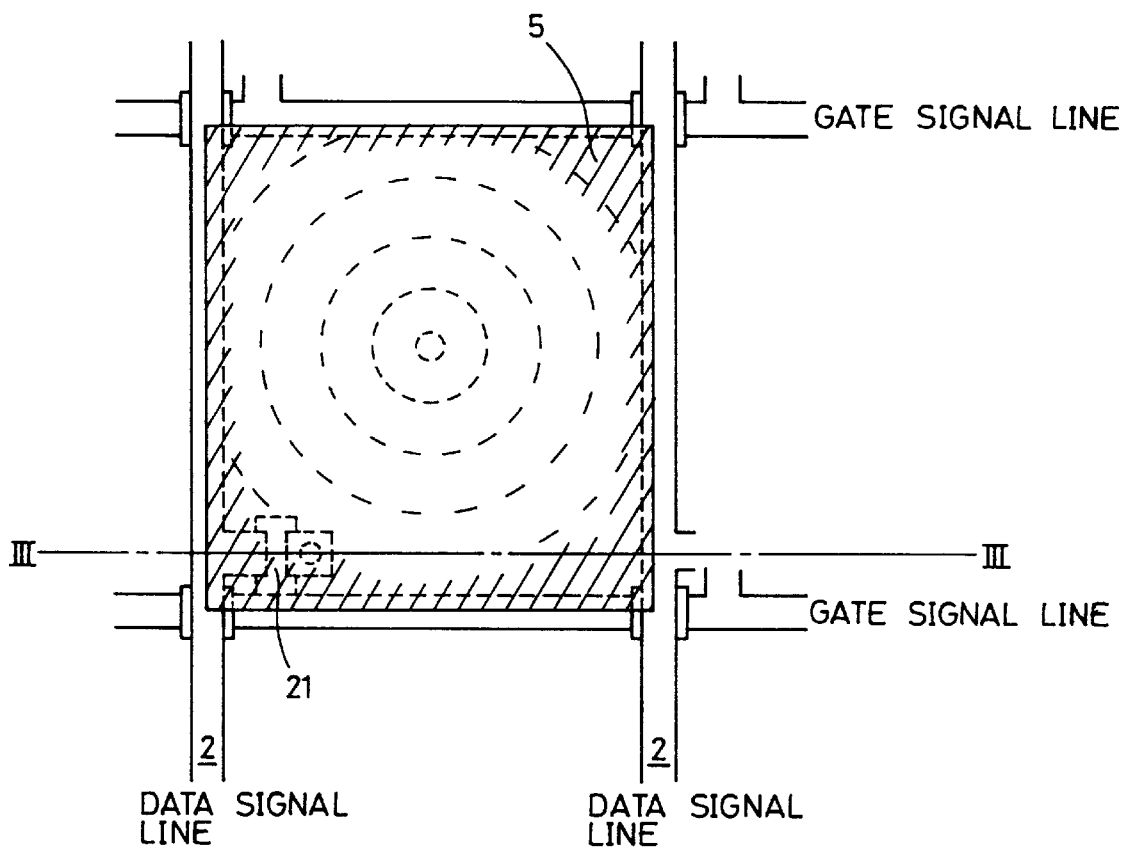
FIG. 2 is a plan view of the liquid crystal panel in the transmission liquid crystal display device according to the present invention.
Figure 3:
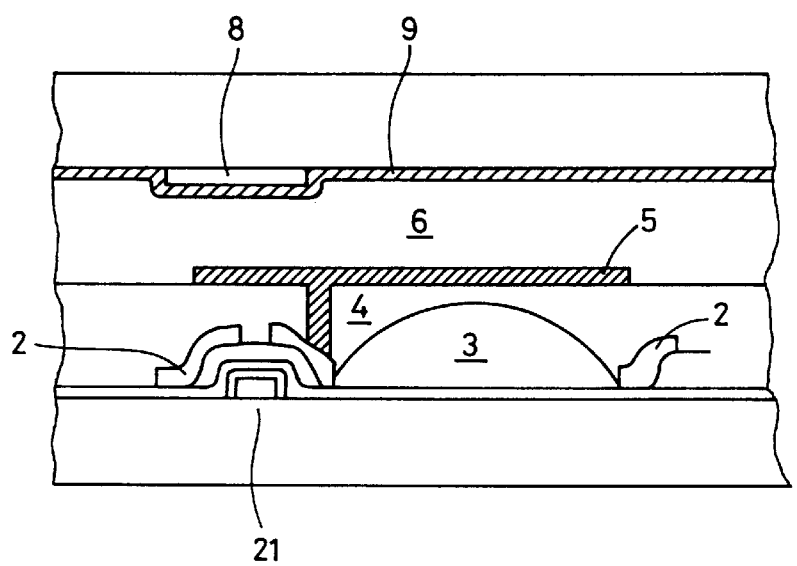
FIG. 3 is a cross sectional view taken along the line III—III of FIG. 2.
Figure 4:
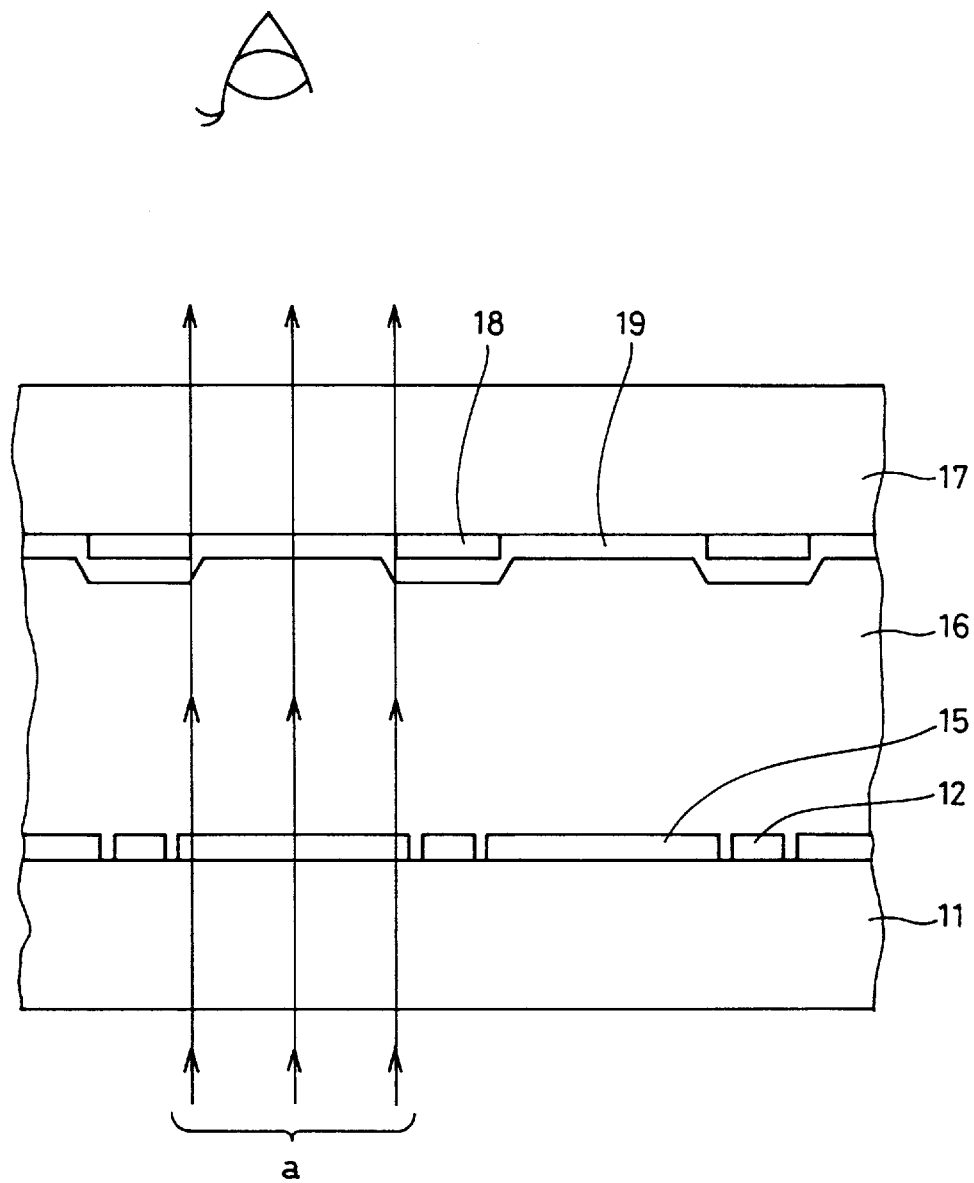
FIG. 4 is a cross sectional view of a liquid crystal panel in a conventional transmission liquid crystal display device.
Figure 5:
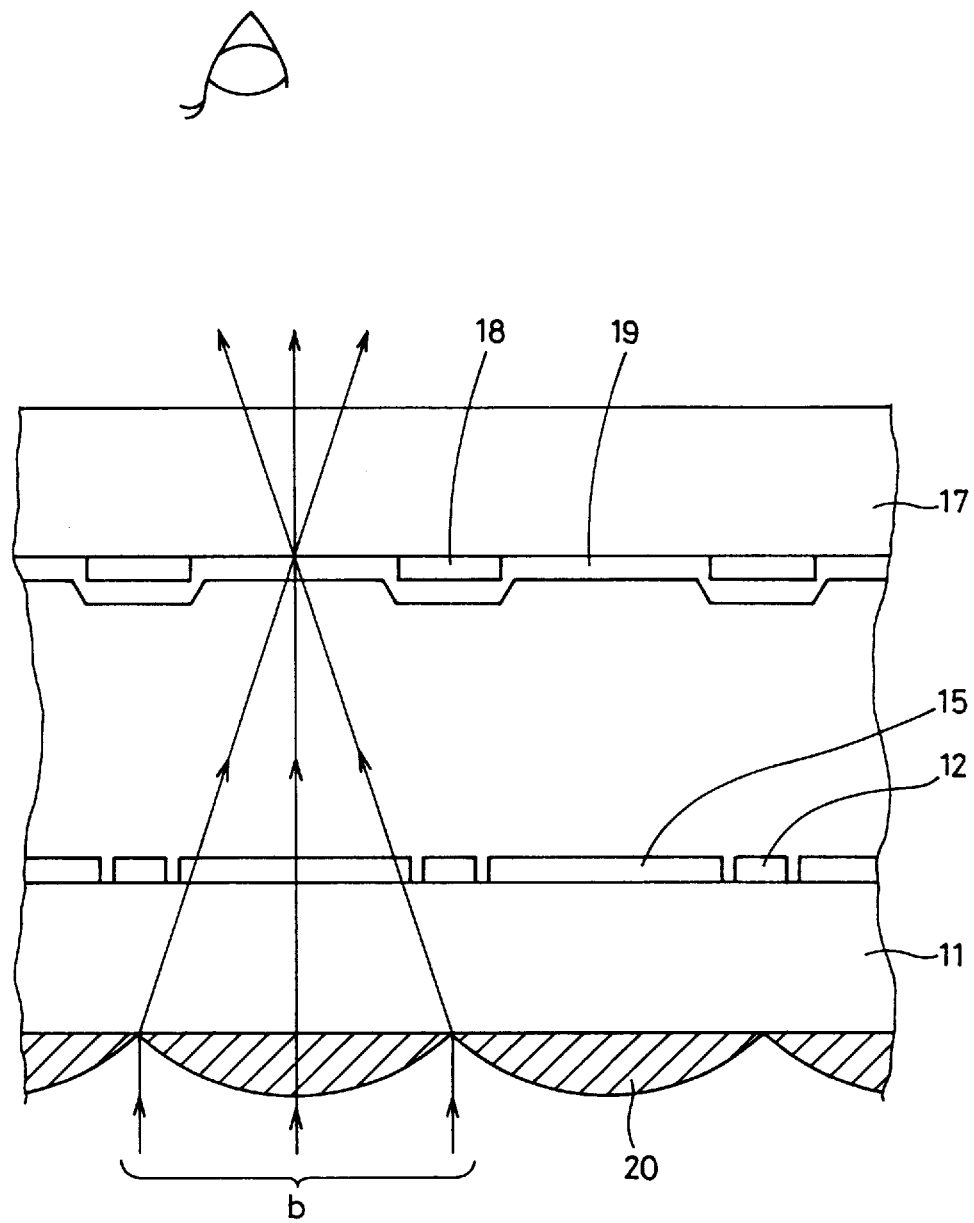
FIG. 5 is a cross sectional view of a liquid crystal panel in a conventional transmission liquid crystal display device.

FIG. 2 is a plan view of the liquid crystal panel in the transmission liquid crystal display device according to the present invention, and FIG. 3 is a cross sectional view taken along the line III—III of FIG. 2.

With reference to FIGS. 1–3, a gate signal line and a data signal line orthogonally cross on one surface of a transparent substrate 1 in liquid crystal panel 10. Provided near a cross point of these lines 2 is a TFT 21 as a switching element. TFT 21 has its gate electrode connected to the gate signal line, and driving of the TFT is controlled depending on a signal input to the gate electrode. Furthermore, the TFT has its source electrode connected to the data signal line and the source electrode of the TFT receives data signals. Furthermore, the drain electrode of the TFT is provided with a connection electrode (not shown) for connection with a pixel electrode. Furthermore, an organic thin film 4 covers the top portions of lines 2, the connection electrode and the TFT.

An organic thin film 3 is formed as a microlens such that one convexed portion thereof corresponds to each pixel. Organic thin film 4 has its surface flattened. A pixel electrode 5 is provided on the flattened surface of organic thin film 4 and is connected by the connection electrode to the drain electrode of the TFT via a contact hole (not shown) formed in organic thin film 4.

A shielding film 8 is provided at one surface of the other transparent substrate 7, and a transparent conductive film 9 is provided over shielding film 8.

The two substrates 1 and 7 are stuck to each other with a gap interposed therebetween and liquid crystal 6 is carried in the gap.

Thus, since organic thin film 3 with the larger refractive index of organic thin film 3, 4 is formed as a convex microlens at a region corresponding to the pixel electrode and the other organic thin film 4 is formed on the organic thin film formed as the convex microlens, focal length of light can be reduced and hence light is not shielded by the shielding film. Furthermore, as the organic thin film with a smaller refractive index formed at the upper side serves as a flattening film as well as a protection film, improved display quality, such as uniformity in the cell gap, prevention of unsatisfactory orientation of liquid crystal molecules, can be achieved and organic thin film 3 formed as the convex microlens can be prevented from being scarred.

Liquid crystal panel 10 according to the present embodiment is thus configured. The lower substrate of the liquid crystal panel can be manufactured in the following manner.

Firstly, films for a TFT, and a data signal line, a gate signal line and a connection electrode connected to the TFT are sequentially formed and patterned to predetermined patterns. Since a liquid crystal panel 10 according to the present embodiment is provided with an irradiator on the back side of transparent substrate 1, a shielding film may be provided under the TFT in order to suppress leakage current of the TFT. The gate electrode may also serve as the shielding film.

Organic thin film 3 of epoxy resin, polyimide resin, or the like is formed thereon by spin coating. An organic thin film of phenol resin, allyl resin, vinyl chloride resin, vinylidene chloride resin, polystyrene resin or the like may be used.

How the organic thin film is made into a microlens will now be described. Exposure from the back side of substrate 1 (back exposure) using non-transmitting lines, that is, the data and gate signal lines of lines 2 previously formed and a photomask transmissivity of which radially changes as masks, and the subsequent development are performed, to selectively remove the portion which has not been exposed. Since the exposure is performed using the photomask transmissivity of which radially changes (a photo mask transmissivity of which gradually changes towards the center of the spherical mask), the amount of exposure increases at a portion closer to the center and thus the resin remains in a convexed shape after the development.

Figure 6:
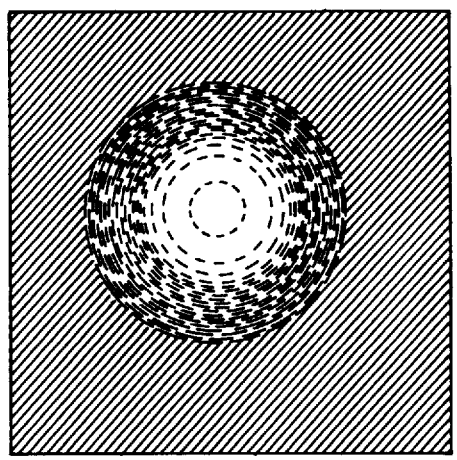
FIG. 6 is a plan view of the photomask pattern in a unit pixel.

Then, microunevenness of the surface of the resin is leveled by heating and hardening the substrate and thus a smooth convex microlens is formed. A microlens having a desired radius of curvature can be formed depending on the density of the photomask having a radially changing transmissivity. The photomask pattern in a unit pixel is shown in FIG. 6.

While the organic thin film is formed by back exposure in the present embodiment, exposure from the upper side of the substrate (from the resin side) using only the photo mask and the subsequent development may be performed.

Then, another organic thin film 4 of acrylic resin, fluororesin or the like is formed on organic thin film 3 by spin coating.

The refractive index of organic thin film 3 provided as the lower layer should be rendered larger than that of organic thin film 4 provided as the upper layer, so that organic thin film 3, 4 has light condensing ability. The refractive indexes of the materials used for organic thin films 3, 4 are listed on Table 1. Any combination of these materials satisfies the relationship in magnitude of the refractive indexes.

Furthermore, since acrylic resin or fluororesin forming organic thin film 4 has low dielectric constant, the parasitic capacitance produced between lines 2 and pixel electrode 5 can be reduced. This allows pixel electrode 5 to overlap lines 2 and consequently the area of pixel electrode 5 can be increased.

Although some of these organic thin films are colored before coating, they can be rendered transparent by optical processing or chemical processing after they are patterned.

TABLE 1

|  | resin | refractive index |
|---|---|---|
| upper layer | acrylic resin | 1.5 |
|  | fluororesin | 1.4 |
|  | epoxy resin | 1.55–1.61 |
|  | polyimide resin | 1.7 |
|  | phenol resin | 1.5–1.7 |
|  | allyl resin | 1.50–1.57 |
| lower layer | vinyl chloride resin | 1.52–1.55 |
|  | vinylidene chloride resin | 1.60–1.63 |
|  | polystyrene resin | 1.59–1.60 |

Furthermore, a contact hole which penetrates organic thin film 4 is formed so that pixel electrode 5 formed on organic thin film 4 is connected to a TFT provided near a cross point of lines 2.

Then, a transparent conductive film serving as pixel electrode 5 is formed by sputtering and is patterned. Thus, pixel electrode 5 is electrically connected to the drain electrode of the TFT via the contact hole penetrating organic thin film 4. The lower substrate of the liquid crystal panel can thus be formed.

In a liquid crystal display device of the configuration according to the present embodiment, light c passing through between lines 2 is utilized for display. Since shielding film 8 is generally formed to slightly overlap pixel electrode 5 in order to prevent leakage of light from the peripheries of pixels, the amount of the light c utilized for display in a liquid crustal display device of the configuration according to the present embodiment is larger than that of light a passing through the gap in shielding film 8 utilized for display in a conventional liquid crustal display device, so that high luminance can be achieved. Furthermore, since organic thin film 4 is formed on organic thin film 3 having light condensing ability, to obtain flatness and achieve protection of organic thin film 3, the organic thin film is not readily scarred and hence light condensing ability thereof is not affected undesirably. Furthermore, since pixel electrode 5 is formed on organic thin film 4, the area of the pixel electrode can be increased so that wide view field angle can be achieved. Thus, a transmission liquid crystal display device with a liquid crystal display panel having high luminance and wide view field angle. Furthermore, since the surface of the liquid crystal panel is flattened, a polarizer (not shown) can be readily stuck thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transmission liquid crystal display device enclosing a liquid crystal layer between a pair of transparent substrates, comprising:

electrical lines provided on one of said paired transparent substrates, formed in a pattern defining a plurality of cross points;

a switching element provided near a cross point of said lines;

a highly transparent, organic thin film layer provided over said lines and said switching element;

a pixel electrode provided on said organic thin film layer;

wherein said organic thin film layer includes a first organic thin film and a second organic thin film formed over said first organic thin film, said first organic thin film forming a light condensing means within said organic thin film layer at a position corresponding to said pixel electrode and where said second organic thin film serves to flatten a surface of said first organic thin film; and wherein the refractive index of a region forming said light condensing means in said organic thin film layer is larger than that of a region other than said light condensing means forming region.

2. The transmission liquid crystal display device according to claim 1, wherein said light condensing means is a convex microlens formed at the position corresponding to said pixel electrode.

3. The transmission liquid crystal display device according to claim 1, wherein said first organic thin film in said organic thin film layer is formed of epoxy resin or polyimide resin and said second organic thin film is formed of acrylic resin or fluororesin.

4. A transmission liquid crystal display device enclosing a liquid crystal layer between a pair of transparent substrates, comprising:

electrical lines provided on one of said paired transparent substrates, formed in a pattern defining a plurality of cross points;

a switching element provided near a cross point of said lines;

a highly transparent, organic thin film layer provided over said lines and said switching element;

a pixel electrode provided on said organic thin film layer; and wherein said organic thin film layer includes a first organic thin film and a second organic thin film, said first organic thin film forming a light condensing means within said organic thin film layer at a position corresponding to said pixel electrode and said first and second organic thin films being formed of two different types of materials, each having a different respective refractive index.

5. The transmission liquid crystal display device according to claim 4, wherein said first organic thin film has a refractive index greater than a refractive index of said second organic thin film.

6. The transmission liquid crystal display device according to claim 5, wherein said second organic thin film serves to flatten a surface of said first organic thin film forming said light condensing means, thereby increasing cell gap uniformity and minimizing scarring of said light condensing means.

7. The transmission liquid crystal display device according to claim 5, wherein said second organic thin film has a low dielectric constant and serves to reduce parasitic capacitance between said pixel electrode and said electrical lines.

8. A transmission liquid crystal display device enclosing a liquid crystal layer between a pair of transparent substrates, comprising:

electrical lines provided on one of said paired transparent substrates, formed in a pattern defining a plurality of cross points;

a switching element provided near a cross point of said lines;

a highly transparent, organic thin film layer provided over said lines and said switching element;

a pixel electrode provided on said organic thin film layer;

wherein said organic thin film layer includes an organic thin film that forms a light condensing means within said organic thin film layer at a position corresponding to said pixel electrode; and wherein the refractive index of a region forming said light condensing means in said organic thin film layer is larger than that of a region other than said light condensing means forming region.

* * * * *